(12) United States Patent
Bogdanik et al.

(10) Patent No.: US 9,774,185 B2
(45) Date of Patent: Sep. 26, 2017

(54) SECURED AND REGULATED CONTINUOUS POWER SUPPLY SYSTEM WITH MULTIPLE INPUTS

(71) Applicant: THALES, Neuilly sur Seine (FR)

(72) Inventors: Philippe Marc Antoine Bogdanik, Valence (FR); David Costes, Valence (FR); Stefan Mollov, Valence (FR)

(73) Assignee: THALES, Neuilly sur Seine (FR)

( * ) Notice: Subject to any disclaimer, the term of this patent is extended or adjusted under 35 U.S.C. 154(b) by 592 days.

(21) Appl. No.: 14/359,973

(22) PCT Filed: Nov. 22, 2012

(86) PCT No.: PCT/EP2012/073402
§ 371 (c)(1),
(2) Date: May 22, 2014

(87) PCT Pub. No.: WO2013/076214
PCT Pub. Date: May 30, 2013

(65) Prior Publication Data
US 2014/0319908 A1    Oct. 30, 2014

(30) Foreign Application Priority Data
Nov. 22, 2011    (FR) ...................... 11 03546

(51) Int. Cl.
*H02J 1/00*        (2006.01)
*H02J 3/00*        (2006.01)
(Continued)

(52) U.S. Cl.
CPC .......... *H02J 1/108* (2013.01); *B60R 16/0315* (2013.01); *H02J 1/10* (2013.01);
(Continued)

(58) Field of Classification Search
CPC ................ H02M 1/10; H02M 3/1584; H02M 2001/007; H02M 2001/0077;
(Continued)

(56) References Cited

U.S. PATENT DOCUMENTS 4,558,230 A    12/1985    Western
5,710,699 A  *  1/1998    King .................... B60L 11/005
                                                    318/139
(Continued)

FOREIGN PATENT DOCUMENTS

CN    1486529 A    3/2004
CN    1504010 A    6/2004
(Continued)

OTHER PUBLICATIONS

International Search Report dated Apr. 12, 2013, from corresponding International Application No. PCT/EP2012/073402.
(Continued)

*Primary Examiner* — Rexford Barnie
*Assistant Examiner* — Rasem Mourad
(74) *Attorney, Agent, or Firm* — Troutman Sanders LLP

(57) ABSTRACT

A continuous power supply system suitable for input connection to N continuous power supply networks that are distinct and connected to a single ground potential, where N is an integer greater than or equal to 2. Said continuous power supply system comprises means for switching/selecting one of the power supply networks, means for regulating an output voltage established by the power supply system, and a control unit for the means for switching/selecting and for the means for regulating. The means for regulating the output voltage includes N distinct buck-boost converters with shared inductance. A given buck-boost converter is dedicated to each power supply network for regulating the voltage output of the power supply system on the basis of an input voltage established by the corresponding power supply network.

7 Claims, 3 Drawing Sheets

(51) Int. Cl.
*H02J 1/10* (2006.01)
*H02M 3/158* (2006.01)
*B60R 16/03* (2006.01)

(52) U.S. Cl.
CPC ........... *H02J 1/102* (2013.01); *H02M 3/1584* (2013.01); *H02M 3/1582* (2013.01); *H02M 2003/1586* (2013.01); *Y10T 307/62* (2015.04)

(58) Field of Classification Search
CPC ........ H02M 3/1582; H02J 9/061; H02J 1/108; H02J 1/102; Y10T 307/696
See application file for complete search history.

(56) References Cited

U.S. PATENT DOCUMENTS

| | | | |
|---|---|---|---|
| 5,945,816 A * | 8/1999 | Marusik | G05F 1/56 307/86 |
| 6,977,488 B1 | 12/2005 | Nogawa et al. | |
| 2004/0027104 A1 | 2/2004 | Ishii et al. | |
| 2004/0067740 A1 * | 4/2004 | Handa | H02J 7/0065 455/127.1 |
| 2004/0095021 A1 * | 5/2004 | Fogleman | H02J 1/102 307/52 |
| 2007/0018502 A1 * | 1/2007 | Bazinet | H02M 1/10 307/80 |
| 2008/0164766 A1 * | 7/2008 | Adest | H02J 1/12 307/80 |
| 2009/0322156 A1 * | 12/2009 | Gscheidle | H02J 1/108 307/87 |

FOREIGN PATENT DOCUMENTS

| | | |
|---|---|---|
| JP | 59-214926 | 12/1984 |
| WO | 2008/025490 | 3/2008 |

OTHER PUBLICATIONS

Office Action for corresponding Chinese Application No. 2015110601210910 dated Nov. 11, 2015.

\* cited by examiner

SECURED AND REGULATED CONTINUOUS POWER SUPPLY SYSTEM WITH MULTIPLE INPUTS

CROSS-REFERENCE TO RELATED APPLICATIONS

This is a U.S. national phase application under 35 U.S.C. §371 of International Patent Application No. PCT/EP2012/073402, filed on Nov. 22, 2012, and claims benefit of priority to French Patent Application No. 11 03546, filed on Nov. 22, 2011. The International Application published on May 30, 2013, as International Publication No. WO 2013/076214 under PCT Article 21(2). The entire contents of these applications are hereby incorporated by reference.

FIELD OF THE INVENTION

The present invention relates to a secured and regulated continuous power supply system with multiple inputs.

BACKGROUND

Several power supply systems satisfying some of these constraints are already known by those skilled in the art.

One such power supply system is for example described in document US 2007/0018502 A, which describes an assembly for a continuous power supply system with a dual input making it possible to eliminate energy losses due to the switching function between the two power supply networks to which it is connected. In this system, the selection of the power supply network is made via a detection circuit that compares the voltages provided by the two networks and selects the power supply network based on the result of that comparison.

Another power supply system of this type is described in document U.S. Pat. No. 4,558,230, which describes a dual-input power supply system capable of switching securely between the two power supply networks.

However, these solutions are not fully satisfactory.

In fact, in the first document, the switching logic between the networks is rigid and obeys a control law depending on the voltage of the power supply networks. Furthermore, the described system does not safely avoid short-circuiting of the two power supply networks, which may have serious repercussions when that system is integrated onboard an aircraft. In fact, this device does not tolerate a simple failure, since if one of the diodes breaks in short circuit, a network may draw directly from the other.

The power supply system described in document U.S. Pat. No. 4,558,230 fully duplicates the power chain as well as most of the control circuits. This device is therefore particularly bulky and heavy.

One of the aims of the invention is therefore to obtain a secure continuous power supply system with multiple inputs delivering a regulated output voltage and having an optimized efficiency, weight, bulk and reliability.

SUMMARY

Thus, the invention relates to a continuous power supply system suitable for delivering an output voltage and suitable for input connection to N distinct continuous power supply networks that are connected to a single ground potential, N being an integer greater than or equal to 2, the power supply networks each providing input voltage, of the type including means for switching/selecting one of the power supply networks, means for regulating the output voltage from input voltages delivered by the power supply networks, and a control unit for controlling the switching/selecting means of one of the power supply networks and the means for regulating the output voltage.

The invention is situated in the field of electrical power supplies from distinct continuous power supply networks. Such power supply systems are connected as input to several of these power supply networks and are suitable for switching from one power supply network to another, for example when the voltage of a priority network no longer allows correct powering of the equipment and it becomes necessary to use a backup network.

This type of power supply system is commonly used in aeronautics, in particular to provide power to the essential electronic equipment for the operation of aircraft.

It is then possible to see that these electrical power supplies are subject to a certain number of constraints. They must thus have high operating safety, particularly for critical aircraft applications; have an adaptable and effective logic for switching between the networks; be light; be suitable for major variations in the voltages delivered by the power supply networks, for example occurring during transitional operation of the aircraft (start up or shut down of the engines), failure in one of the networks, etc.; be compact; prevent failures from spreading from one power supply network to the other networks; have a high efficiency in order to minimize the size of the devices for evacuating the heat they generate; and have a structure compatible with the self-test requirements that exist in aeronautics.

To that end, the invention relates to a power supply system characterized in that the means for regulating the output voltage has N distinct buck/boost converters with shared inductance, a given buck/boost voltage converter with shared inductance being dedicated to each power supply network to regulate the output voltage of the power supply system from the input voltage delivered by the corresponding power supply network.

The power supply system according to examples of the invention may include one or more of the following features, considered alone or according to all technically possible combinations: the means for switching/selecting one of the power supply networks comprise N switching units with controllable semiconductors and N unidirectional diodes, a given switching unit with controllable semiconductors and a given unidirectional diode being associated with the selection of a given power supply network;

the unidirectional diodes are respectively arranged between the output of the buck/boost voltage converter with shared inductance dedicated to the power supply network with the selection of which the unidirectional diodes are respectively associated, and the output of the power supply system, such that said switching/selection of one of the power supply networks is secured, i.e., energy exchanges between the power supply networks are avoided; each buck/boost voltage converter with shared inductance includes two switching units with controllable semiconductors and two unidirectional diodes, the switching units with controllable semiconductors and the diodes of the switching/selection means being one of the switching units with controllable semiconductors and one of the unidirectional diodes of the buck/boost voltage converter with shared inductance dedicated to the power supply network with the selection of which said switching units with controllable semiconductors and said are respectively associated; the control unit is designed to control the opening or closing of the switching units with semiconductors of the switching/ selection means independently of the input voltages delivered by the power supply networks; the control unit includes a monitoring module designed to diagnose the unidirectionality of the unidirectional diodes of the switching/selection means of one of the power supply networks from the output voltage of the power supply system; the monitoring module simultaneously diagnoses the unidirectionality of the diodes, independently of the selected power supply network; the power supply system is onboard an aircraft, the power supply networks being powered, respectively, by a continuous voltage source or by a combination of continuous voltage sources, the continuous voltage sources powering the power supply networks all being connected to a single ground potential; and the power supply system is connected as input to exactly 2 power supply networks, N then being equal to 2.

BRIEF DESCRIPTION OF THE DRAWINGS

The invention will be better understood upon reading the following description, provided solely as an example, and done in reference to the appended drawings, in which.

DETAILED DESCRIPTION

The secured and regulated continuous power supply system with multiple inputs according to the invention, hereinafter referred to as the "power supply system", is for example designed to equip an aircraft. It is designed to be input connected to N distinct power supply networks, N being an integer greater than or equal to 2.

Figure 1:
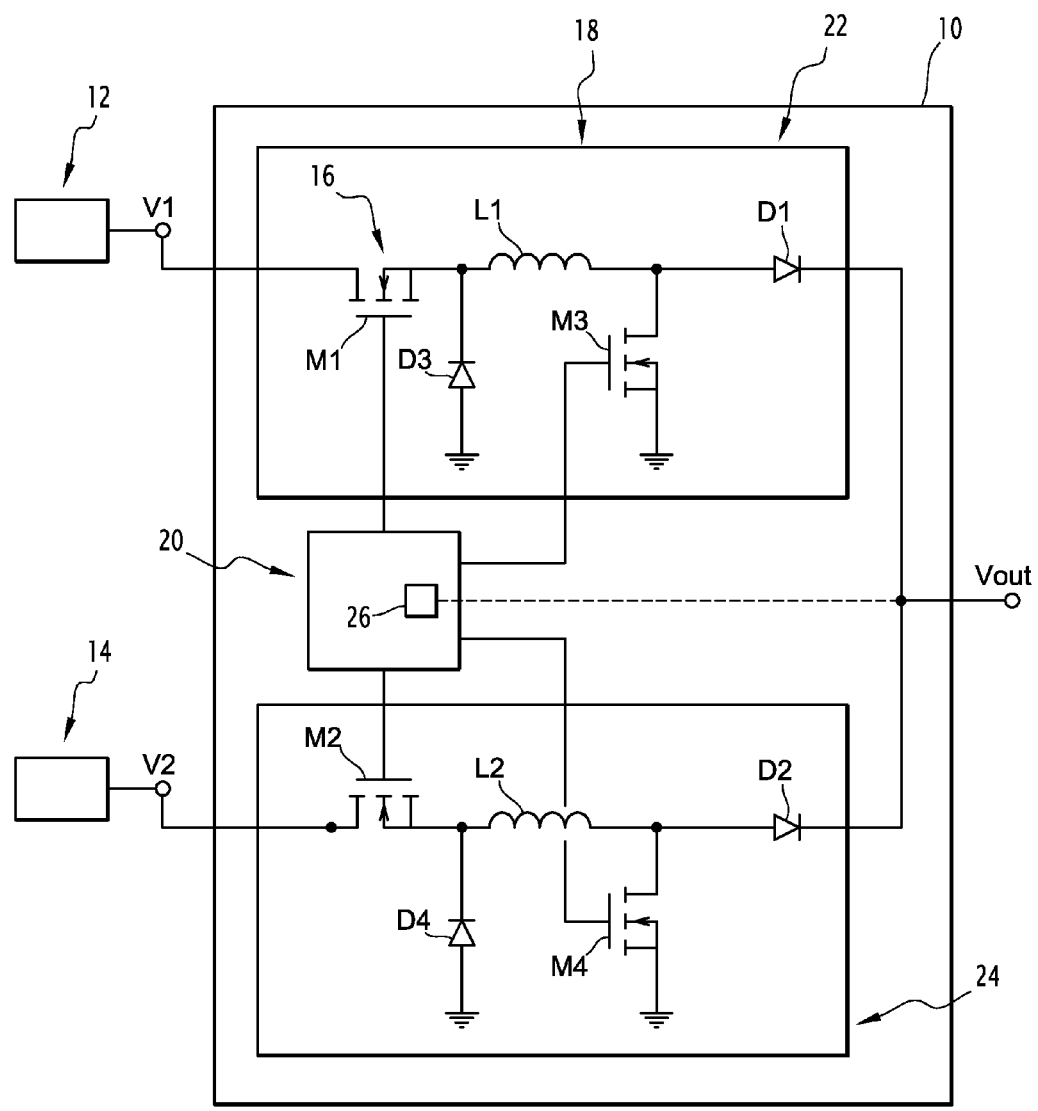
FIG. 1 is a diagrammatic illustration illustrating a continuous power supply system according to an example of the invention.

FIG. 1 illustrates an example in which said system is input connected to two power supply networks.

In reference to FIG. 1, the power supply system 10 is input connected to two distinct power supply networks 12, 14. These power supply networks 12, 14 deliver input voltages V1 and V2, respectively, to the power supply system 10.

The power supply system 10 is then suitable for selecting one of the power supply networks 12, 14 delivering the input voltage V1, V2 to it and not using the redundant power supply network 12, 14, as well as securely switching from the currently selected power supply network 12, 14 to the redundant network.

It is further suitable for delivering a regulated output voltage Vout at a stipulated voltage from the input voltage V1, V2 provided by the selected power supply network 12, 14.

To that end, the power supply system 10 has means 16 for securely switching/selecting one or the other of the power supply networks 12, 14, and means 18 for regulating the output voltage Vout. Furthermore, it includes a control unit 20 for controlling the means 16 for securely switching/selecting one or the other of the power supply networks 12, 14 and means 18 for regulating the output voltage Vout.

In a known manner, the voltage V1 delivered by the first power supply network 12 is generally a voltage equal to +28V coming from rectifier transformers 104 powered by an alternator 102 of the aircraft. The voltage V2 delivered by the second power supply network 14 is then either delivered by a battery 106 with a rated voltage of +28V, or also comes from a rectifier transformer powered by an alternator of the aircraft, or comes from any combination of continuous voltage sources connected to a single ground potential 108.

In fact, the voltages V1, V2 delivered by the power supply networks 12, 14 are very dynamic, for example due to the transitional ratings of the aircraft engines actuating the alternators, downgraded operating modes of the power supply networks 12, 14, reconfigurations, etc.

In the example of FIG. 1, the input voltages V1, V2 vary between 10 V and 80 V.

Still in reference to FIG. 1, the means 16 for securely switching/selecting one or the other of the power supply networks 12, 14 includes two switching units with controllable semiconductors M1, M2 connected to the control unit 20 and two unidirectional diodes D1, D2.

The switching units with controllable semiconductors M1 and M2 are suitable for ensuring switching between the power supply networks 12, 14. To that end, they are respectively associated with the selection of the power supply networks 12 and 14 and are controlled by the control unit 20 to that end.

In the example of FIG. 1, the switching units with controllable semiconductors M1, M2 are of the MOSFET type.

In order for the power supply system 10 to select the power supply network 12, the MOSFET M2 is commanded to be opened by the control unit 20 and the power supply network 14 is thus on used by the power supply system 10. The MOSFET M1 can then be commanded to be closed or open, as is seen later. The power supply network 12 then delivers the input voltage V1 to the power supply system 10.

Conversely, to select the power supply network 14, the reference MOSFET M1 is commanded to be open and the power supply network 12 is not used to power the power supply system 10. The reference MOSFET M2 can then be commanded to be closed or open, as will be seen below. The power supply network 14 then delivers the input voltage V2 to the power supply system 10.

The diodes D1, D2 are capable of securing the switching between the power supply networks 12, 14, i.e., to prevent the transfer of energy from one power supply network to the other. This event can, for example, occur in case of simple failure of the control unit 20.

To that end, they are respectively associated with each of the power supply networks 12, 14 and are capable of preventing the transfer of energy from one power supply network 12, 14 to the other.

To that end, and as illustrated in FIG. 1, they are unidirectional and are inserted between each of the power supply networks 12, 14 and the output Vout of the power supply system 10. More particularly, they are respectively positioned between the output of a buck/boost voltage converter associated with each power supply network 12, 14 and the output of the power supply system 10, as will be seen below. They then only allow current to pass from the corresponding power supply network 12, 14 to the output of the power supply system 10.

Thus, when the power supply network 12 is selected, the diode D1 is on or off depending on the operating phases of a buck-boost converter described below and the diode D2 is off such that the reinjection of energy from the power supply network 12 to the network 14 is avoided.

Conversely, when the power supply network 14 is selected, the diode D2 is on or off depending on the operating phases of a buck-boost converter described below and the diode D1 is off such that the reinjection of energy from the power supply network 14 to the network 12 is avoided.

The means 18 for regulating the output voltage Vout comprise two buck/boost voltage converters with shared inductance 22, 24, hereinafter referred to as buck-boost converters 22, 24.

Each buck-boost converter 22, 24 is capable of regulating the output voltage Vout of the power supply system 10 at a stipulated voltage from the voltage V1, V2 delivered by the power supply network 12, 14.

Such converters are for example described in document U.S. Pat. No. 6,977,488.

Each buck-boost converter 22, 24 includes at least two switching units with controllable semiconductors, two rectifiers and one shared inductance. These elements are distributed into branches, a first branch and a second branch, each branch including a switching unit and a rectifier in series and being connected to a node of the shared inductance.

In the power supply system 10 according to the example of the invention, a buck-boost converter 22, 24 is dedicated to each power supply network 12, 14. This makes it possible, inter alia, for the power supply system 10 to increase the operating security of the system, as will be seen below.

Furthermore, the power components performing the secure switching/selection function of the power supply system 10 are also used for the regulating function of the output voltage Vout from the input voltage V1, V2.

Thus, as illustrated in FIG. 1, the switching units M1, M2 are also one of the two switching units with a semiconductor of the buck-boost converters 22, 24 and are positioned on the upper part of the first branch of the respective buck-boost converter. Furthermore, the diodes D1, D2 are one of the two rectifiers of the buck-boost converters 22, 24 and are positioned on the upper part of the second branch of the respective buck-boost converter.

Thus, the reference buck-boost converter 22 associated with the reference power supply network 12 includes the switching unit M1 and the diode D1, as well as a diode D3, a switching unit with controllable semiconductors M3 and a shared inductance L1.

The reference buck-boost converter 24 associated with the reference power supply network 14 includes the switching unit M2 and the diode D2, as well as the diode D4, a switching unit with controllable semiconductors M4 and a shared inductance L2.

The diodes D1, D2 are then respectively positioned on the upper part of the two branches of each buck-boost converter 22, 24 to avoid transferring energy from one power supply network 12, 14 to the other network, as described above.

The lower parts of the two branches of each buck-boost converter 22, 24 are connected to a single ground potential.

In the example of FIG. 1, the switching units with controllable semiconductors M2 and M4 are also of the MOSFET type.

The outputs of the buck-boost converters 22, 24 are also connected to each other to produce the output voltage Vout of the power supply system 10.

The control unit 20 is capable of controlling the switching units with controllable semiconductors M1, M2 to select the power supply network 12, 14, as described above.

To that end, and in a known manner, the control unit 20 includes sequential logic circuits (not shown) capable of implementing a selection logic between the two power supply networks.

In the power supply system 10 according to the invention, the selection unit makes the preferred selection of the power supply network 12, 14 delivering an input voltage V1, V2 coming from an alternator comprised by the aircraft when possible, rather than the selection of the battery-powered network.

The selection of the power supply network 12, 14 is then independent of the voltages V1, V2 delivered by the power supply networks 12, 14.

When one of the networks 12, 14 is powered by a battery, that in particular makes it possible to avoid discharging a battery unnecessarily.

The control unit 20 is further suitable for controlling the means 18 for regulating the output voltage Vout from said voltage Vout and the input voltage V1, V2.

To that end, and in a known manner, the control unit 20 includes one or more control blocks (not shown), for example with pulse width modulation, to control the switching units M1, M3, M2, M4 of the buck-boost converters 22, 24.

Still in a known manner, based on the input voltage V1, V2 and the output voltage Vout of the power supply system 10, the switching units M1, M3, M2, M4 of the buck-boost converter 22, 24 of the selected power supply network 12, 14 are commanded to be open and/or closed during cutting cycles such that the output voltage Vout is substantially constant and equal to a stipulated output voltage.

The control unit 20 is also capable of diagnosing the unidirectionality of the diodes D1, D2 to avoid any exchange of energy between the power supply networks 12 and 14.

To that end, the control unit 20 includes a monitoring module 26 connected to the output of the power supply system 10 and capable of diagnosing the operating status of the diodes D1 and D2 from the voltage Vout.

Thus, when the power supply network 12 is selected, the switching unit M3 is controlled to be open and/or closed by the control unit 20 to regulate the voltage Vout. If the diode D1 fails and is in short circuit mode, the voltage boost function of the buck-boost converter 22 is inoperative. The voltage Vout is then no longer correctly regulated and the failure of the diode D1 is detected immediately by the monitoring module 26.

Likewise, when the power supply network 14 is not used by the power supply system 10, the switching unit M2 is commanded to be open and the switching unit M4 is commanded to be closed. If the diode D2 fails in short circuit mode, the voltage Vout is short-circuited through the diode D2 and the switching unit M4, which is detected by the monitoring module 26.

Conversely, if the power supply network 14 is used by the power supply system 10, the switching unit M3 is commanded to be closed and the switching unit M1 is commanded to be open. If the diode D1 fails in short-circuit, the voltage Vout delivered by the power supply system 10 is then zero and the short-circuit failure of the diode D1 is detected immediately by the monitoring module 26. The failure of the diode D2 is detected in the same manner as before: when the latter is short-circuited, the voltage boost function of the buck-boost converter 24 is inoperative. The voltage Vout is then no longer correctly regulated and the failure of the diode D2 is detected immediately by the monitoring module 26.

Thus, the monitoring module 26 continuously diagnoses the unidirectionality of the diodes D1, D2, independently of the power supply network 12, 14 selected by the control unit 20.

The operation of the power supply system 10 according to the invention will now be described in reference to FIG. 1, in the event the power supply network 14 is first selected.

During the operation of the power supply system 10, the power supply network 14 delivers the input voltage V2 to the power supply system 10.

The power supply network 12 is not used via the command ordering the MOSFET M1 into the open position by the control unit 20.

The diodes D1, D2 prevent energy from being transferred between the power supply networks 12, 14.

The unidirectionality of these networks D1, D2 is continuously diagnosed by the monitoring module 26 from the output voltage Vout, and the selection of the power supply network 14 is maintained as long as the selection logic of the control unit 20 does not command the switch from the power supply network 14 to the redundant power supply network 12.

The voltage Vout is then regulated by the buck-boost converter 24 commanded by the control unit 20 via the control of the MOSFETs M2 and M4.

When the selection logic of the control unit 20 commands the switch from the power supply of the power supply network 14 to the power supply network 12, the MOSFET M2 is can be open and the power supply network 14 is then not used.

The buck-boost converter 22 becomes active and the MOSFETs M1 and M3 are controlled by the control unit 20 to regulate the output voltage Vout.

The power components M1, M2, D1, D2 performing the secure switching between the power supply networks 12, 14 are also used by the buck-boost converters 22, 24 to regulate the output voltage Vout of the power supply system 10.

As a result, the switching function between the power supply networks 12, 14 has no effect on the efficiency of the power supply system 10 according to the invention. In fact, in general, the switching function between the power supply networks is obtained by placing, in series, one or more power components dedicated to the switching/selection function and arranged between the power supply networks and the regulating function of the output voltage. The power components then dissipate part of the electrical energy passing through them, which decreases the efficiency of the power supply system.

Furthermore, the selection logic of the power supply network 12, 14 is independent of the input voltage V1, V2 delivered by the power supply networks. As previously described, this allows the preferred selection of the power supply network powered by an alternator of the aircraft rather than a battery, which increases the usage duration thereof.

Furthermore, each branch of each buck-boost converter 22, 24 includes two power components in series. Then, the power supply system 10 tolerates a simple breakdown of one of these power components for the feared event, which is the transfer of power between the two power supply networks. Because the malfunctions of the switching units M1 and M2 do not affect this feared event, the malfunction of the diodes D1 and D2 in short circuit is monitored continuously by the monitoring module 26. The control unit 20 then commands the opening of the switching units M1 and M2 if the failure of the diodes D1 and D2, respectively, is detected.

Likewise, the rectifiers used in the upper part of the second branches of the buck-boost converters 22, 24 being unidirectional diodes and not switches, the power supply system 10 is made able to tolerate the simple breakdown of the control unit 20, the energy transfer between the power supply networks 12, 14 being avoided. This is true irrespective of the failure mode of the control unit 20: for example, a failure resulting in untimely commands of the switching units, an absence of command of said units, etc.

The reliability, operating security and efficiency of the power supply system according to the invention are thus simultaneously optimized.

Furthermore, these different gains only result in a small increase in the bulk of the power supply system 10, inasmuch as the topology of the power supply system involves duplicating power components on one inductance (shared inductance L1, L2 of the buck-boost converters 22, 24), unlike many topologies known by those skilled in the art, which involve the complete duplication of the transformers associated with this type of power supply system, which constitutes a significant increase in complexity, volume and cost.

At the same time, the power supply system 10 according to the invention eliminates any electromechanical element for switching between the power supply networks 12, 14 and/or regulating the output voltage Vout, such components being able to significantly decrease the lifetime of such a power supply system.

Lastly, the output voltage Vout delivered by the power supply system 10 according to the invention being regulated via the buck-boost converters 22, 24, the power supply system 10 is particularly suitable for being positioned upstream from the transformer, for example when a galvanic insulation is required in the electronic equipment. In fact, the efficiency of the transformer depends on the quality of the regulation of the voltage delivered to it as input. The power supply system 10 according to the invention delivering a voltage Vout regulated via its regulating means 18, it thus makes it possible to obtain an efficiency of the downstream energy conversion devices that is significantly improved relative to many topologies known by those skilled in the art. The devices for evacuating the heat generated by the transformer may then be smaller.

In all of the preceding, an example has been described in which the power supply system 10 is input connected to two power supply networks 12, 14.

Figure 2:
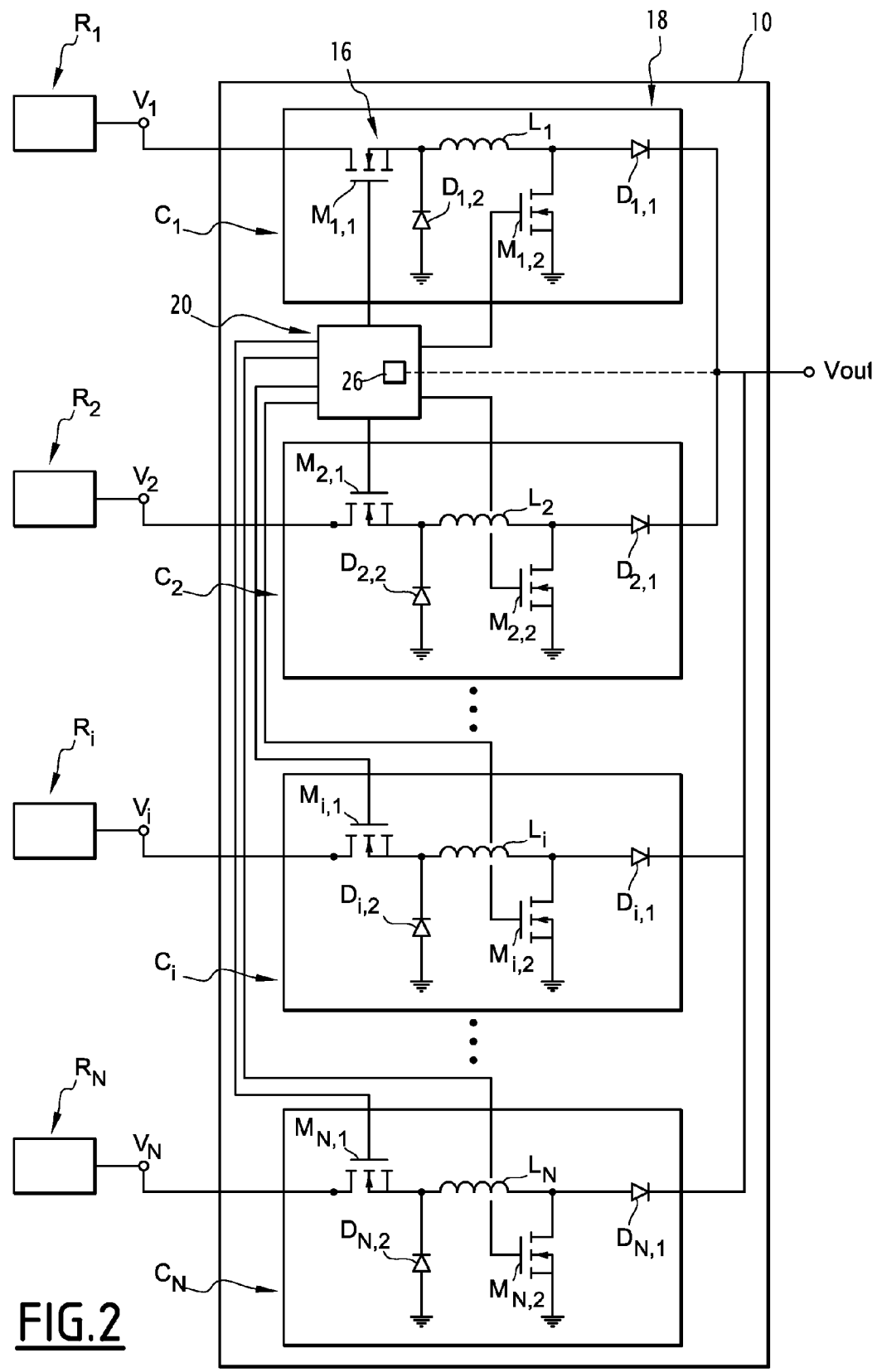
FIG. 2 is a diagrammatic illustration illustrating a continuous power supply system according to another example of the invention.
Figure 3:
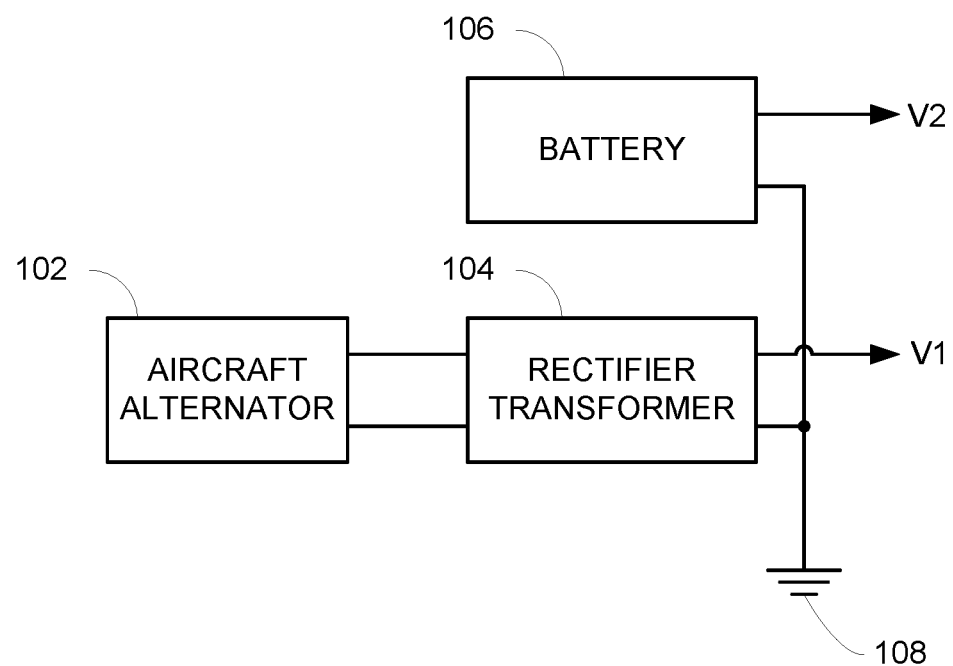
FIG. 3 is a diagrammatic illustrating power supply networks according to another example of the invention.

The example of FIG. 2 corresponds to the general case of a power supply system 10 suitable for being input connected to N distinct power supply networks $R_1, \ldots, R_N$ each delivering an input voltage $V_1, \ldots, V_N$, N being an integer greater than or equal to 2, said power supply networks being connected to a single ground potential.

The means 16 for switching/selecting one of the power supply networks comprise N switching units with controllable semiconductors $M_{1,1}, \ldots, M_{N,1}$ and N unidirectional diodes $D_{1,1}, \ldots, D_{N,1}$, a given switching unit with controllable semiconductors $M_{i,1}$ and a given unidirectional diode $D_{i,1}$, being associated with the selection of a given power supply network $R_1$, i being an integer comprised between 2 and N.

In the embodiment of FIG. 2, a given buck-boost converter $C_i$ is dedicated to each power supply network $R_i$ to regulate the output voltage Vout of the power supply system 10 from the input voltage $V_i$ delivered by the corresponding power supply network $R_i$. The power supply system 10 thus includes N distinct buck-boost converters controlled by the control unit 20 to select a power supply network $R_1, \ldots R_N$ from among the N power supply networks, independently of the input voltages $V_1, \ldots, V_N$, and to regulate the output voltage Vout from the input voltage $V_i$ delivered by the selected power supply network $R_i$.

As previously described, the buck-boost converter $C_i$ associated with a given power supply network $R_i$ includes a shared inductance $L_i$, two switching units with controllable semiconductors $M_{i,1}$, $M_{i,2}$ and two unidirectional diodes $D_{i,1}$, $D_{i,2}$ respectively positioned on a first and second branch of the converter connected to the shared inductance. Each branch thus includes two power components in series. Furthermore, each branch of each buck-boost converter $C_i$ is connected to the control unit 20.

The diode $D_{i,1}$ positioned on the upper part of the second branch of the buck-boost converter $C_i$ prevents the transfer of energy from the other power supply networks to the power supply network $R_i$ with which the selection of said diode is associated, such that the switching/selection of a power supply network $R_i$ among N power supply networks is secure. In addition to its energy conversion function in the corresponding buck-boost converter $C_i$, this diode $D_{i,1}$ performs a non-return function.

Furthermore, the switching unit $M_{i,1}$ of the first branch of the buck-boost converter $C_i$ is also associated with the selection of the corresponding power supply network $R_i$ by the control unit 20.

In order for the control unit 20 to select the power supply network $R_i$ from among the N power supply networks, the control unit 20 commands said switching unit $M_{i,1}$ to be closed or open depending on the operating phases of the buck-boost converter $C_i$, and the switching units $M_{k,1}$ of the other buck-boost converters $C_k$ are commanded to be open by the control unit 20, k being an integer between 2 and N and different from i.

During switching from the power supply network $R_i$ to another network $R_j$ (j being comprised between 2 and N, j different from i), the reference switching unit $M_{i,1}$ is commanded to be open and the switching unit $M_{j,1}$ is commanded to be open or closed depending on the operating phases of the buck-boost converter Cj, the switching units $M_{i,1}$ being kept in the open position, for any i that is an integer comprised between 2 and N and different from i and j.

The outputs of all of the buck-boost converters $C_1, \ldots, C_N$ are connected to each other to produce the output voltage Vout.

Furthermore, the unidirectionality of the diodes $D_{1,1}, \ldots, D_{N,1}$ is diagnosed by the monitoring module 26 from the output voltage Vout in the same manner as before.

Lastly, the power supply networks $R_1, \ldots, R_N$ are respectively powered by a continuous voltage source or a combination of continuous voltage sources, the continuous voltage sources powering the power supply networks (12, 14; $R_1, \ldots, R_N$) all being connected to a single ground potential.

Of course, other examples can be considered.

The invention claimed is:

1. A continuous power supply system suitable for delivering an output voltage and suitable for input connection to N distinct continuous power supply networks that are connected to a single ground potential, N being an integer greater than or equal to 2, the power supply networks each providing input voltage, comprising:

a switch switching/selecting one of the power supply networks, a regulator regulating the output voltage from input voltages delivered by the power supply networks, and a control unit controlling the switch of one of the power supply networks and the regulator, wherein the regulator comprises N distinct buck/boost converters with shared inductance, each buck/boost converter comprising a first branch and a second branch, each branch including a switching unit and a rectifier unit in series and being connected to a different node of the shared inductance of the buck/boost converter, a given buck/boost voltage converter with shared inductance being dedicated to each power supply network to regulate the output voltage of the power supply system from the input voltage delivered by the corresponding power supply network, the switch comprises N switching units with controllable semiconductors and N unidirectional diodes, a given switching unit with controllable semiconductors and a given unidirectional diode, being associated with the selection of a given power supply network, and the control unit comprises a monitoring module designed to diagnose the unidirectionality of the unidirectional diodes of the switch of one of the power supply networks from the output voltage of the power supply system.

2. The power supply system according to claim 1, wherein the unidirectional diodes are respectively arranged between the output of the buck/boost voltage converter with shared inductance dedicated to the power supply network with the selection of which the unidirectional diodes are respectively associated, and the output of the power supply system, such that said is secured by at least energy exchanges between the power supply networks are avoided.

3. The power supply system according to claim 1, wherein each buck/boost voltage converter with shared inductance comprises two switching units with controllable semiconductors and two unidirectional diodes, the switching units with controllable semiconductors and the diodes of the switch being one of the switching units with controllable semiconductors and one of the unidirectional diodes of the buck/boost voltage converter with shared inductance dedicated to the power supply network with the selection of which said switching units with controllable semiconductors and said diodes are respectively associated.

4. The power supply system according claim 1, wherein the control unit is designed to control the opening or closing of the switching units with semiconductors of the switch independently of the input voltages delivered by the power supply networks.

5. The power supply system according to claim 1, wherein the monitoring module simultaneously diagnoses the unidirectionality of the diodes, independently of the selected power supply network.

6. The power supply system according to claim 1, wherein it is onboard an aircraft, the power supply networks being powered, respectively, by a continuous voltage source or by a combination of continuous voltage sources, the continuous voltage sources powering the power supply networks all being connected to a single ground potential.

7. The power supply system according to claim 1, wherein it is connected as input to exactly two power supply networks, N then equal to 2.

* * * * *